(12) United States Patent  
Froehler et al.

(10) Patent No.: US 8,780,739 B2
(45) Date of Patent: Jul. 15, 2014

(54) METHOD AND DEVICE FOR DATA PROCESSING AND COMMUNICATION SYSTEM COMPRISING SUCH DEVICE

(75) Inventors: Josef Froehler, Baierbrunn (DE); Matthias Schnitter, München (DE); Thomas Treyer, München (DE)

(73) Assignee: Nokia Siemens Networks Oy, Espoo (FI)

( * ) Notice: Subject to any disclaimer, the term of this patent is extended or adjusted under 35 U.S.C. 154(b) by 146 days.

(21) Appl. No.: 12/739,470

(22) PCT Filed: Oct. 22, 2008

(86) PCT No.: PCT/EP2008/064277
§ 371 (c)(1),
(2), (4) Date: Jul. 20, 2010

(87) PCT Pub. No.: WO2009/053386
PCT Pub. Date: Apr. 30, 2009

(65) Prior Publication Data
US 2011/0310911 A1 Dec. 22, 2011

(30) Foreign Application Priority Data

Oct. 23, 2007 (EP) .................................. 07020700

(51) Int. Cl.
*H04J 1/16* (2006.01)
*H04L 12/28* (2006.01)
*H04J 3/16* (2006.01)
*H04L 1/18* (2006.01)

(52) U.S. Cl.
CPC ............ *H04L 1/1812* (2013.01); *H04L 1/1874* (2013.01)
USPC ............................. 370/252; 370/465; 714/748

(58) Field of Classification Search
USPC .................................. 370/252, 357–360, 465
See application file for complete search history.

(56) References Cited

U.S. PATENT DOCUMENTS 6,161,207 A 12/2000 Lockhart et al.
6,556,592 B1 4/2003 Kasuya
(Continued)

FOREIGN PATENT DOCUMENTS

CN 1852076 A 10/2006
EP 0683579 A2 11/1995
(Continued)

OTHER PUBLICATIONS

Michikazu Fukuchi, Company Application Book, Nikkei Computer extra edition, Japan, Nikkei BP, Oct. 15, 2001, pp. 50-53—English translation of p. 52.

(Continued)

*Primary Examiner* — Xavier Szewai Wong
(74) *Attorney, Agent, or Firm* — Laurence A. Greenberg; Werner H. Stemer; Ralph E. Locher

(57) ABSTRACT

A method and a device for data processing in a network having a first network element and a second network element performs the following steps: (a) the second network element provides a control information to the first network element; (b) a portion of data sent from the first network element to the second network element is identified by the control information; and (c) upon identification of the portion of data a retransmission from the first network element to the second network element can be initiated.

20 Claims, 1 Drawing Sheet

(56) References Cited

U.S. PATENT DOCUMENTS

| | | | |
|---|---|---|---|
| 6,640,094 | B1 | 10/2003 | Tabeta |
| 7,236,494 | B2 | 6/2007 | Mallory |
| 7,489,708 | B2 | 2/2009 | Kim |
| 7,920,888 | B2 | 4/2011 | Beming et al. |
| 8,068,488 | B2 * | 11/2011 | Drottar et al. ............. 370/389 |
| 2002/0034182 | A1 | 3/2002 | Mallory |
| 2003/0189977 | A1 * | 10/2003 | Sweitzer et al. ............ 375/222 |
| 2005/0036540 | A1 | 2/2005 | Noma et al. |
| 2005/0105524 | A1 * | 5/2005 | Stevens et al. ............. 370/389 |
| 2005/0111451 | A1 | 5/2005 | Kim |
| 2006/0227913 | A1 | 10/2006 | Sedarat |
| 2007/0049316 | A1 | 3/2007 | Beming et al. |
| 2007/0248020 | A1 * | 10/2007 | Hoque et al. ............... 370/249 |

FOREIGN PATENT DOCUMENTS

| | | |
|---|---|---|
| EP | 1073218 A2 | 1/2001 |
| EP | 1507397 A2 | 2/2005 |
| GB | 2408660 A | 6/2005 |
| JP | 63318838 A | 12/1988 |
| JP | 6085799 A | 3/1994 |
| JP | 10210079 A | 8/1998 |
| JP | 2000134371 A | 5/2000 |
| JP | 2003163952 A | 6/2003 |
| JP | 2006245781 A | 9/2006 |
| WO | 0010298 A1 | 2/2000 |
| WO | 0072498 A1 | 11/2000 |
| WO | 0211383 A2 | 2/2002 |
| WO | 2004091114 A1 | 10/2004 |
| WO | 2006102065 A2 | 9/2006 |

OTHER PUBLICATIONS

Series G: Transmission Systems and Media, Digital Systems and Networks, Digital Sections and Digital Line System—Access Networks, "Asymmetric Digital Subscriber Line Transceivers 2 (ADSL2)" Recommendation ITU-T G.992.3, Apr. 2009.

Series G: Transmission Systems and Media, Digital Systems and Networks, Digital Sections and Digital Line System—Access Networks, "Very High Speed Digital Subscriber Line Transceivers", ITU-T Recommendation G.993.1, Jun. 2004.

Series G: Transmission Systems and Media, Digital Systems and Networks, Digital Sections and Digital Line System—Access Networks, Very High Speed Digital Subscriber Line Transceivers 2 (VDSL2), ITU-T Recommendation G.993.2, Feb. 2006.

Series G: Transmission Systems and Media, Digital Systems and Networks, Digital Transmission Systems—Digital Sections and Digital Line System—Access Networks, Asymmetric Digital Subscriber Line (ADSL) Transceivers, ITU-T Recommendation G.992.1, Jun. 1999, Previously CCITT Recommendation.

Series G: Transmission Systems and Media, Digital Systems and Networks, Digital Sections and Digital Line System—Access Networks, Asymmetric Digital Subscriber Line Transceivers 2 (ADSL2) -Extended Bandwidth (ADSL2PLUS) Recommendation ITU-T G.992.5, Jan. 2009.

* cited by examiner

METHOD AND DEVICE FOR DATA PROCESSING AND COMMUNICATION SYSTEM COMPRISING SUCH DEVICE

BACKGROUND OF THE INVENTION

Field of the Invention

The invention relates to a method and to a device for data processing and to a communication system comprising such a device.

DSL (Digital Subscriber Line) is a family of technologies that provide digital data transmission over the wires of a telephone access network. DSL technologies are often referred to as "xDSL", wherein "x" stands for various DSL variants.

Asymmetric Digital Subscriber Line (ADSL, ITU-T G.992.1) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

ADSL2 (ITU-T G.992.3) and ADSL2+ (ITU-T G.992.5) are variants of ADSL, both providing better performance compared to basic ADSL.

VDSL (Very high speed DSL, ITU-T G.993.1) as well as VDSL2 (Very high speed DSL 2, ITU-T G.993.2) are xDSL technologies providing even faster data transmission over a single twisted pair of wires. This is mainly achieved by using a larger frequency range.

xDSL technologies exploit the existing infrastructure of copper wires that were originally designed for plain old telephone service (POTS). They can be deployed from Central Offices (COs), from, e.g., fiber-fed cabinets preferably located near the customer premises, or within buildings.

Real communication paths have losses and errors due to basic physical laws. In the digital world, a link is typically deemed to be of good quality when the bit error rate is below $10^{-12}$ and the packet loss rate is better than $10^{-8}$.

Nevertheless, there are communication links with a significantly higher (worse) bit error rate due to technical restrictions. One such example is the DSL line with a typical packet loss rate being larger than $10^{-5}$.

Some applications are tolerant to packet losses or bit errors, but a significant number of applications require an error rate amounting to nearly zero. In such scenarios, retransmission or Forward Error Correction (FEC) are used to overcome the problem of lost or defective packets.

One example for a quite loss-sensitive application is real-time streaming of video content. Here, a single packet loss results in an error visible as an artefact on the TV screen. An application of high-definition TV (HDTV) requires an enormous amount of packets per second, which would lead to an unacceptable number of artefacts if the basic packet loss rate of DSL is applied.

The Transmission Control Protocol (TCP) is known to provide a retransmission capability by adding overhead to the transmitted data. It requires a complex processing at the sender and at the receiver and requires a flow of acknowledgement packets in the reverse direction, thereby also adding overhead data to the reverse or feedback channel.

The overhead introduced by TCP is 20 bytes per forwarded packet in forwarding direction (TCP header) and 64 bytes per forwarded packet in reverse direction (TCP acknowledgement packet). As TCP is an end-to-end protocol, it introduces a delay to the forwarded data stream which is higher than the round-trip delay of the complete end-to-end link path. As a consequence, TCP introduces a delay of more than one second to an Internet application, if the application requires real-time streaming and relies on retransmission capabilities.

TCP is not compliant with multicast distribution. As a consequence, it cannot be used for applications like IPTV over DSL.

BRIEF SUMMARY OF THE INVENTION

The problem to be solved is to overcome the disadvantages as stated above and in particular to provide a solution that allows an efficient utilization of DSL connections even suitable for high-quality applications like HDTV.

This problem is solved according to the features of the independent claims. Further embodiments result from the depending claims.

In order to overcome this problem, a method for data processing in a network comprising a first network element and a second network element is provided, the method comprising the following steps:

(a) the second network element provides a control information to the first network element;
(b) a portion of data sent from the first network element to the second network element is identified by said control information;
(c) upon identification of said portion of data a retransmission from the first network element to the second network element can be initiated.

Hence, the first network element is able to determine upon reception of the control information at least one portion of data (e.g., a data packet or a data frame) that has been correctly or incorrectly received at the receiver and hence may need retransmission.

It is to be noted that said portion of data may comprise at least one portion of data. In particular, the data may be organized in (several) frames and/or packets.

This approach bears in particular the following advantages:
- A packet loss rate can be improved by at least three orders of magnitude;
- The approach allows interoperability of old and new equipment (equipment capable and non-capable of the present mechanism);
- The feedback channel needs very low bandwidth only;
- The approach has only minimum impact on other services that do not require retransmission but are sensible to delay;
- Further, the approach requires minimum protocol overhead at the second network element (receiver), in particular at a DSL modem;
- Bandwidth in forwarding direction does not have to be increased since there is no need for additional data (e.g., headers) to be appended to regular data in forwarding direction;
- Only moderate protocol overhead in the first network element, e.g., a DSLAM;
- The approach may be implemented in software, so existing second network element equipment (receivers, DSL modems) may be upgraded easily by a firmware update;
- The approach provided allows a short latency.

The approach provided may in particular utilize a DSL connection (or an xDSL connection or derivates thereof) between the first network element and the second network element.

Furthermore, the first network element and the second network element may be network elements within a network utilizing the Ethernet protocol, in particular they may be realized as hop-to-hop connections as a section or segment of an end-to-end connection.

In an embodiment, the method may be utilized at a data link layer or at a physical layer.

In another embodiment, said network is a network utilizing the Ethernet protocol.

In a further embodiment, the first network element comprises a buffer for storing at least one portion of data.

This buffer may be also referred to and/or used as a retransmission buffer.

In a next embodiment, the data is at least partially organized in packets and/or frames.

Pursuant to another embodiment, the first network element and the second network element are connected via a digital subscriber line.

The digital subscriber line may comprise any derivate of DSL (xDSL, VDSL, ADSL, etc.).

According to an embodiment, the control information identifies at least a portion of the data, in particular by utilizing one of the following:
  a one-way function;
  a hash-function;
  a code, in particular a CRC-code.

Thus, various kinds of methods or functions may be used to map the data (preferably, a frame or packet thereof) to a given representation or fingerprint, which preferably requires little bandwidth to be transmitted from the second network element to the first network element (preferably via a feedback channel).

According to another embodiment, step (c) further comprises at least one of the following steps:
  if the portion of data identified at the first network element corresponds to the oldest portion of data stored at the first network element, this oldest portion of data is deleted at the first network element;
  if the portion of data identified at the first network element is not stored at the first network element, no action is taken;
  if the portion of data identified at the first network element corresponds to a portion of data that is not the oldest portion of data stored at the first network element, the currently identified portion of data is deleted at the first network element and the portions of data older than this currently identified portion of data are retransmitted from the first network element to the second network element.

In yet another embodiment, the control information identifies at least one portion of data that was not successfully received at the second network element.

In particular, the control information may comprise a CRC content received and a CRC content calculated from the received data at the second network element.

As another embodiment, the control information comprises a first content, in particular a CRC content received at the second network element, and a second content, in particular a CRC content calculated from the received data at the second network element.

Hence, both such CRC contents may be conveyed as control information to the first network element in order to enable the first network element to determine whether the data or the CRC sent to the second network element was incorrect.

It is to be noted that any other kind of code or fingerprint instead of a CRC code may be utilized.

According to a next embodiment, the first network element utilizes the control information to determine the portion of data that was unsuccessfully transmitted.

Pursuant to yet an embodiment, the first network element retransmits the portion of data if the first content and/or the second content conveyed to the first network element via said control information, does/do not match a content, in particular a CRC content, determined by the first network element for the particular portion of data.

The first content may in particular comprise a CRC content received at the second network element. The second content may in particular comprise a CRC content calculated from the received data by the second network element.

The CRC content may in particular be determined, e.g., calculated and/or resolved and/or determined by comparison by the first network element.

According to yet an embodiment, step (c) further comprises at least one of the following step:
  if the portion of data identified at the first network element corresponds to the data identified as being unsuccessfully received at the second network element, the first network element retransmits this portion of data to the second network element.

As another embodiment, the first network element and/or the second network element is/are a digital subscriber line access multiplexer (DSLAM).

It is also an embodiment that the second network element is a customer premises equipment, in particular a DSL modem.

The problem stated above is also solved by a device for data processing comprising a processor unit that is equipped and/or arranged such that the method as described herein is executable on said processor unit.

According to an embodiment, the device is a communication device, in particular a network element. Preferably, said device can be a DSLAM or a DSL modem.

The problem stated supra is further solved by a communication system comprising the device as described herein.

DESCRIPTION OF THE INVENTION

The solution provided herein may in particular modify the behavior of the DSLAM and the DSL modem at the Data Link Layer. One particular objective is that corrupted data frames (or data packets) can be retransmitted, wherein a protocol overhead may be minimized.

This approach does in particular not guarantee a successful retransmission for any bit error possible, but in most cases a successful retransmission is provided.

E.g., if the retransmission is successful in 999 out of 1000 bit error events, the overall bit error rate or packet loss rate can be improved by three orders of magnitude, which may suffice for a large number of applications.

In addition, the protocol overhead is extremely small and requires small processing overhead within the receiver. The solution may be based on the Ethernet protocol but it may be applicable in particular to any protocol utilizing checksums over data frames and/or data packets.

Figure 1:
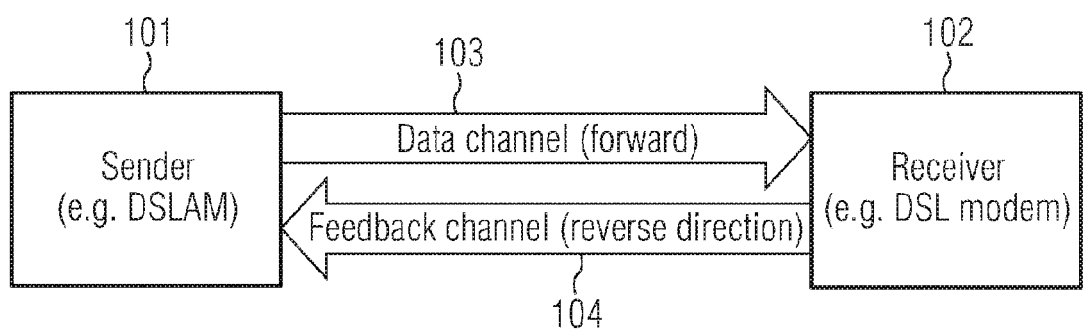
FIG. 1 shows an architecture of a retransmission approach or concept.

A basic architecture of a retransmission concept is shown in FIG. 1 comprising a first network element 101, e.g., a sender, in particular a DSLAM, and a second network element 102, e.g., a receiver, in particular a DSL modem that may be a customer premises equipment (CPE). The first network element 101 sends data via a data channel 103 (forward channel) and the second network element sends data via a feedback channel 104 (reverse direction). The direction from the first network element 101 to the second network element 102 may also be referred to as downstream direction, whereas the opposite can be referred to as upstream direction.

However, the approach described herein is applicable to both, the upstream direction as well as the downstream direction.

The sender 101 transmits data, in particular organized in data packets or data frames, to the receiver 102 along the forwarding channel 103 and at the same time temporarily stores a copy of such data in an internal buffer.

For every successfully received frame the receiver 102 sends back a control information, in particular an acknowledge frame, which contains a fingerprint of the received frame.

The fingerprint can, e.g., be of 2 bytes length, thereby significantly reducing an overhead to be conveyed via the feedback channel 104.

Advantageously, there may be no need for an overhead in forward direction via the data channel 103, the receiver 102 may generate the fingerprint all by itself, e.g., as a checksum across the regular payload data received.

The sender 101 may use said acknowledge frames provided by the receiver 102 to determine which packet and/or frame has been successfully transmitted. Further, the sender 101 may retransmit those packets and/or frames that have not been successfully transmitted to the receiver 102.

A content of the acknowledge frame may comprise a fingerprint of the frame. The sender 101 compares this fingerprint with fingerprints of frames stored in its buffer (in particular a retransmission buffer). The sender may advantageously remove a matching frame out of its retransmission buffer.

Preferably, the transmitted frames are stored in sequence of the transmission within said retransmission buffer. Therefore, the acknowledge frame received in most cases is associated with the oldest buffer entry, because the DSL environment processes data frames in sequence (one after another).

In case of a packet loss, the acknowledge frame received at the sender 101 may refer to a data frame that does not correspond to the oldest buffer entry. As an exemplary algorithm, various cases may be handled as follows:
(1) The acknowledge frame received at the sender refers to the oldest data frame stored in the retransmission buffer: The entry of this oldest data frame is deleted from the retransmission buffer.
(2) The acknowledge frame received at the sender matches no data frame stored in the retransmission buffer: No action is taken.
(3) The acknowledge frame received at the sender refers to a data frame N stored in the retransmission buffer, said data frame not being the oldest entry in the retransmission buffer: The entry of this data frame N is deleted from the retransmission buffer and the data frames stored in the retransmission buffer that are older than said data frame N are retransmitted to the receiver.
(4) The sender wants to transmit a subsequent data frame and to buffer this subsequent data frame accordingly, but the retransmission buffer is full: The entry of this oldest data frame is deleted from the retransmission buffer; a new entry of this actual (subsequent) data frame is added to the buffer.

If the Data Link Layer protocol is Ethernet, the Ethernet frame may provide a checksum to be utilized for the purpose of this approach.

The Ethernet protocol provides a two-byte CRC field at the end of the data frame. This CRC field can be used as a fingerprint, wherein a processing overhead in the receiver can be significantly reduced.

Hence, the acknowledge frame comprises these 2 bytes and is much shorter than a regular Ethernet frame. Because (in a DSL environment) all frames are separated with start-bytes and stop-bytes from one another, such short frames can advantageously be transmitted in the reverse direction. The sender can easily distinguish regular data frames from acknowledge frames by checking the frame length. If the frame length amounts to, e.g., 4 bytes (fingerprint and regular CRC, each comprising a length of 2 bytes), the sender detects the acknowledge frame. In case the frame length equals or comprises more than 64 bytes, the frame is recognized as regular data.

In addition or as an alternative to the embodiment provided, the control information may identify at least one portion of payload data (in particular a data frame and or a data packet) that was not successfully received at the second network element 102.

The sender 101 transmits the data to the receiver 102 along the forwarding channel 103 and stores a copy of the data forwarded (temporarily) in an internal buffer (also referred to as retransmission buffer). In particular for each unsuccessfully received frame (i.e., the receiver 102 determines a data frame to be corrupted), the receiver 102 sends back a negative acknowledge (NAK) frame, which comprises the content of the CRC field of the received frame as well as the CRC value calculated by the receiver itself based on the payload data of the received frame.

Advantageously, these two CRC values are both sent back to the sender 101, as the receiver 102 does not know whether the corruption relates to the payload data (with the CRC field being error-free) or to the CRC value (with the payload data being error-free).

Figure 2:
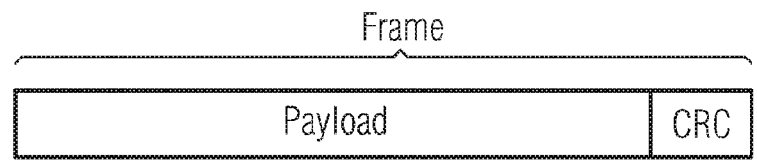
FIG. 2 shows as how a frame can be partitioned into payload and CRC.

"Payload" in this context in particular refers to the data of the frame without the CRC field, as shown in FIG. 2.

As the CRC value of an Ethernet frame has 2 bytes and NAK frames are sent in case of unsuccessful transmission only, the bandwidth required in reverse direction 104 is considerably small. In forward direction 103 no overhead data is required.

The sender 101 uses said NAK frame to determine which data packet and/or frame has been transmitted unsuccessfully. This particular data frame is then retransmitted.

The NAK frame may advantageously comprise two CRC values, wherein one of those two CRC values is correct. The sender 101 compares the two CRC values to the CRCs of the data frames stored in the sender's 101 retransmission buffer and retransmits the matching data frame.

Preferably, the retransmission buffer stores the transmitted data frames in the sequence according to their transmission. Therefore, if a NAK frame is sent from the receiver 102 to the sender 101, it is sent for the oldest buffer entry which has been corrupted during transmission. This is particularly the case in the environment of DSL where a strict order of data frames is kept.

As an exemplary algorithm, various cases may be handled as follows:
(1) One of the two CRC values conveyed with the NAK frame matches a data frame in the sender's retransmission buffer: This data frame is retransmitted by the sender.

(2) Each of the two CRC values conveyed with the NAK frame matches a separate data frame in the sender's retransmission buffer (i.e., two data frames are identified): The oldest data frame is retransmitted by default.
(3) The sender wants to transmit a subsequent data frame and to buffer this subsequent data frame accordingly, but the retransmission buffer is full: The entry of this oldest data frame is deleted from the retransmission buffer; a new entry of this actual (subsequent) data frame is added to the buffer.

The NAK frame preferably comprises a payload of 4 bytes (the two CRC values) as well as a 2-byte CRC value (regularly appended to each Ethernet frame) and hence is significantly shorter than a regular Ethernet frame.

Because (in a DSL environment) all frames are separated with start-bytes and stop-bytes from one another, such short frames can advantageously be transmitted in the reverse direction. The sender can easily distinguish regular data frames from NAK frames by checking the frame length. If the frame length amounts to, e.g., 6 bytes (4 bytes payload and 2 bytes regular CRC), the sender detects the NAK frame. In case the frame length equals or comprises more than 64 bytes, the frame is recognized as regular data.

Further Embodiment Details:
(1) Backward Compatibility of DSL Modems:
If the DSL modem does not support the retransmission algorithm as suggested, it will not send such 4-byte frames (6-bytes in case of NAK frames) in upstream direction. As a consequence, there will be no retransmission. So, any new DSLAM (supporting the retransmission algorithm) and old DSL modem are able to interoperate without any need for configuration or auto-negotiation.

(2) Retransmission for Upstream Traffic:
According to the exemplary scenario set forth above, only downstream traffic may be protected. However, the same approach and/or algorithm can be used in upstream direction or for both directions simultaneously.

(3) Loss of ACK Frame:
The algorithm suggested handles most bit error situations that may happen on DSL. However, there may be a scenario when the acknowledge frame itself gets lost or corrupted when being conveyed via the reverse channel. In this case, the data frame may be unnecessarily retransmitted and received twice at the receiver. Most applications (e.g., TCP-based or RTP-based) can handle such duplication of data frames, in particular because of their identical sequence numbers. If there are applications that cannot handle such duplication of data frames, data flows for such applications can be excluded from retransmission, see (4) hereinafter.

(4) Enabling/Disabling Retransmission for Certain Applications:
The algorithm described retransmits data frames that are temporarily stored in the retransmission buffer. If a data frame is not (or no longer) stored in the retransmission buffer, a corresponding acknowledge frame will not confuse the algorithm (see above: no action taken in such case).

Therefore, the sender may decide, which frames are to be buffered or not. For example, the sender may monitor the TCP layer and exclude all such data frames with a certain TCP port from being buffered.

Such TCP port number is just taken as an example. Any filter rule that may be accessible and/or applicable by the sender can be used to disable or enable retransmission.

Advantageously, such feature does not impose any processing overhead to the receiver.

The same applies to NAK frames accordingly.

(5) Fingerprint Collision:
Another issue of the algorithm set forth using acknowledge frames (not NAK frames) is the (considerably low) probability that subsequent frames may have different payloads, but lead to identical fingerprints.

If the first data frame (with fingerprint 'k') is lost/corrupted during forward transmission, this data frame is not retransmitted. Instead, a second data frame (also with fingerprint 'k') is retransmitted, even if there was no bit error inside this frame.

However, this is considered a minor issue, because even if only a 2-byte fingerprint is chosen, this will result in a probability of less than $10^{-4}$ for two identical frames to occur. The consequence is that the packet loss rate is improved at least by an order of 4, which may suffice in a great many number of scenarios.

Of course, the probability of two identical frames may be lowered by providing a more precise fingerprint. E.g., a fingerprint of 4 bytes length may reduce the probability of a fingerprint collision to a value below $10^{-9}$.

(6) Loss of NAK Frame:
The approach provided handles most bit error situations, which can happen on DSL. However, the NAK frame itself may get lost or corrupted when being conveyed via the reverse channel. In this case no retransmission takes place. The probability for this event is minor and in the order of the product of the packet loss rate in forward direction and the packet loss rate in reverse direction. E.g., if DSL has a packet loss rate of $10^{-5}$, this event has a probability in the order of $10^{-10}$, which is negligible in most cases.

(7) Payload and CRC Corrupted:
In this case the NAK frame does not match an entry of the sender's retransmission buffer. Hence, no data frame is retransmitted. However, the probability for such an error is considerably small.

(8) Double Match in Buffer:
If each CRC of the NAK matches a frame in the buffer (two frames are identified), the sender cannot determine which of the two data frames are to be retransmitted. Per default, the sender retransmits the topmost (i.e., oldest) frame.

With this default setting, half of those (rather unlikely) cases can be solved.

Nevertheless, this is a minor issue, because the probability for such double matches is less than $10^{-4}$ for 2-byte CRC values. As a consequence, the packet loss rate is improved at least by 4 orders of magnitude which may suffice in most cases.

(9) Errors in the Forwarding Path Make Two Frames Out of One:
This may happen when bit errors add a wrong start/stop sequence in the middle of a data frame and/or data packet.

Hence, if the algorithm with NAK frames is used, the receiver will send a NAK frame for the first half of the data packet and another NAK frame for the second half of the data packet.

The last NAK frame will be recognized by the sender and the correct retransmission of the complete data packet (data frame) will be initiated.

Further Advantages

The approach provided shows in particular the following advantages:

No protocol overhead (e.g., headers) is generated for the forwarding path. Hence, the forwarding bandwidth needs not be increased.

An overhead for the reverse path is small, because the size of the acknowledge frames may in particular amount to 4 bytes only. In case of the NAK frames, the size of the overhead amounts to 6 bytes.

The receiver and the sender can use a cyclic redundancy check (CRC) to generate the fingerprint for every data frame or data packet independently from one another. Such CRC-capable hardware may be available in Data Link Layer devices, e.g., Ethernet MACS.

The additional processing required at the receiver may be considerably small. Hence, the algorithm may be implemented by only upgrading the firmware of existing receivers without the requirement of providing new receiver hardware with more processing power (e.g., upgrade of already deployed ADSL2+ CPEs used for IPTV).

Retransmission can be enabled/disabled for certain applications, e.g., depending on the application's sensitivity to jitter introduced by retransmission.

The sender does not need to know whether the receiver can handle the retransmission protocol suggested. Any combination of sender and receiver with and without implementation of said retransmission protocol can interoperate without any need for configuration and/or auto-negotiation.

The delay introduced by the retransmission suggested is minor and consists of the round-trip time of the DSL connection only.

The approach provided is applicable for upstream and/or downstream direction(s).

The approach provided can be applied to (ATM-based) ADSL2+ when Ethernet is run on top of ATM (as it is the case in IPTV applications over ADSL2+).

The mechanism using NAK frames can be used for any transport protocol that in particular provides and/or allows transmission of checksums across the payloads of its data frames.

The mechanism using acknowledge frames can be used for any transport protocol.

The invention claimed is:

1. In a network including a first network element and a second network element, a data processing method, which comprises:

organizing data in frames to obtain data frames at the first network element, the data frames having control information including a cyclic redundancy check content;

storing the data frames in a buffer of the first network element;

transmitting the data frames from the first network element to the second network element;

providing the control information, including the cyclic redundancy check content received at the second network element, from the second network element back to the first network element;

if the control information provided back to the first network element corresponds to the control information of a data frame that is the oldest data frame stored in the buffer of the first network element, deleting said data frame from the buffer of the first network element;

if the control information provided back to the first network element does not correspond to the control information of any data frame stored in the buffer of the first network element, taking no action;

if the control information provided back to the first network element corresponds to the control information of a data frame that is not the oldest data frame stored in the buffer of the first network element, deleting said data frame from the buffer of the first network element and retransmitting data frames older than said data frame from the first network element to the second network.

2. The method according to claim 1 configured at a data link layer or at a physical layer.

3. The method according to claim 1, which comprises using the Ethernet protocol in the network.

4. The method according to claim 1, wherein the first network element and the second network element are connected via a digital subscriber line.

5. The method according to claim 1, wherein the control information includes a first cyclic redundancy check content received at the second network element, and a second cyclic redundancy check content calculated from a received payload at the second network element.

6. The method according to claim 5, wherein the first network element retransmits the data frame if the first content and/or the second content conveyed to the first network element via the control information, does/do not match a content determined by the first network element for the particular data frame.

7. The method according to claim 6, wherein the first content includes a cyclic redundancy check content received at the second network element and the second content includes a cyclic redundancy check content calculated from the received data by the second network element.

8. The method according to claim 1, wherein at least one of the first network element and the second network element is a digital subscriber line access multiplexer.

9. The method according to claim 1, wherein the second network element is a customer premises equipment.

10. The method according to claim 1, wherein the second network element is a customer premises Digital Subscriber Line modem.

11. A data processing device, comprising a processor unit with a processor configured and programmed to execute the method according to claim 1 on said processor unit.

12. The device according to claim 11 configured as a communication device.

13. The device according to claim 11 configured as a network element.

14. The device according to claim 11 configured as a Digital Subscriber Line Access Multiplexer or a Digital Subscriber Line modem.

15. The method according to claim 1, which comprises sending the control information only in case the data frame is received incorrectly.

16. The method according to claim 1, which comprises, in the first network element, comparing the cyclic redundancy check content comprised by the control information to the cyclic redundancy check content of the data frames stored in the buffer.

17. A device, comprising:

a first network element including a processor configured to:

organize data in frames to obtain data frames, the data frames having control information including a cyclic redundancy check content;

store the data frames in a buffer of the first network element;

transmit the data frames with the control information including the cyclic redundancy check content to a second network element;

receive from the second network element, the control information including the cyclic redundancy check content that was previously transmitted to the second network element;

if the control information provided back to the first network element corresponds to the control information of a data frame that is the oldest data frame stored in the buffer of the first network element, delete said data frame from the buffer of the first network element;

if the control information provided back to the first network element does not correspond to the control information of any data frame stored in the buffer of the first network element, take no action; and if the control information provided back to the first network element corresponds to the control information of a data frame that is not the oldest data frame stored in the buffer of the first network element, delete said data frame from the buffer of the first network element and retransmit data frames older than said data frame from the first network element to the second network.

18. The device according to claim 17, wherein the first network element is a Digital Subscriber Line Access Multiplexer and the second network element is a Digital Subscriber Line Modem.

19. A communication system, comprising:

a first network element and a second network element;

the first network element including a processor configured to:

organize data in frames to obtain data frames, the data frames having control information including a cyclic redundancy check content, store the data frames in a buffer of the first network element;

transmit the data frames with the control information including the cyclic redundancy check content to the second network element, receive from the second network element, the control information including the cyclic redundancy check content that was previously transmitted to the second network element, if the control information provided back to the first network element corresponds to the control information of a data frame that is the oldest data frame stored in the buffer of the first network element, delete said data frame from the buffer of the first network element;

if the control information provided back to the first network element does not correspond to the control information of any data frame stored in the buffer of the first network element, take no action; and if the control information provided back to the first network element corresponds to the control information of a data frame that is not the oldest data frame stored in the buffer of the first network element, delete said data frame from the buffer of the first network element and retransmit data frames older than said data frame from the first network element to the second network.

20. The communication system according to claim 18, wherein the first network element is a Digital Subscriber Line Access Multiplexer and the second network element is a Digital Subscriber Line Modem.

* * * * *